(12) United States Patent
Petricek (10) Patent No.: US 10,564,034 B2
(45) Date of Patent: Feb. 18, 2020

(54) METHOD FOR CALIBRATING A ROTATABLE AND PIVOTABLE PIECE OF TECHNICAL STAGE EQUIPMENT

(71) Applicant: Zactrack GmbH, Vienna (AT)

(72) Inventor: Werner Petricek, Kierling (AT)

(73) Assignee: Zactrack GmbH, Vienna (AT)

( * ) Notice: Subject to any disclaimer, the term of this patent is extended or adjusted under 35 U.S.C. 154(b) by 0 days.

(21) Appl. No.: 16/488,949

(22) PCT Filed: Feb. 26, 2018

(86) PCT No.: PCT/EP2018/054664
§ 371 (c)(1),
(2) Date: Aug. 27, 2019

(87) PCT Pub. No.: WO2018/154108
PCT Pub. Date: Aug. 30, 2018

(65) Prior Publication Data
US 2019/0376844 A1 Dec. 12, 2019

(30) Foreign Application Priority Data

Feb. 27, 2017 (AT) .................................. 50154/2017

(51) Int. Cl.
*H04N 5/225* (2006.01)
*G01J 1/42* (2006.01)
(Continued)

(52) U.S. Cl.
CPC ............ *G01J 1/4257* (2013.01); *F21V 14/02* (2013.01); *H04N 5/23299* (2018.08); *F21W 2131/406* (2013.01)

(58) Field of Classification Search
CPC ........ H04N 5/2256; H04N 5/74; H04N 5/232; H04N 9/3194; G03B 21/53; H05B 37/0227; H05B 37/00
See application file for complete search history.

(56) References Cited

U.S. PATENT DOCUMENTS 5,010,459 A * 4/1991 Taylor ................ G05B 19/0421
315/292
5,414,328 A * 5/1995 Hunt .................... H05B 37/029
315/292
(Continued)

FOREIGN PATENT DOCUMENTS

EP 0814344 12/1997
EP 1385335 1/2004
(Continued)

OTHER PUBLICATIONS

International Search Report and the Written Opinion dated May 4, 2018 From the International Searching Authority Re. Application No. PCT/EP2018/054664 and Its Translation of Search Report Into English. (14 Pages).

(Continued)

*Primary Examiner* — Kelly L Jerabek (57) ABSTRACT

Method for calibrating a spotlight (1) which is rotatable about a pan axis (7) by entering pan values and pivotable about a tilt axis (8) by entering tilt values to absolute angle coordinates, wherein the spotlight creates an illuminated, preferably elliptical, area (5) on the ground (3) by means of a directed cone of light (4), wherein a light sensor (2) is placed on the ground (3), wherein the illuminated area (5) is moved across the ground (3) by rotating and pivoting the spotlight (1), wherein the light sensor (2) detects the edges of the illuminated area (5) and wherein a mapping assignment of the pan values and/or tilt values of the spotlight (1) to the angular coordinates of the spotlight (1) is determined by rotating and/or pivoting the spotlight (1) and by detecting the illuminated area (5) anew.

17 Claims, 4 Drawing Sheets

(51) Int. Cl.
*H04N 5/232* (2006.01)
*F21V 14/02* (2006.01)
*F21W 131/406* (2006.01)

(56) References Cited

U.S. PATENT DOCUMENTS

| | | | | |
|---|---|---|---|---|
| 6,326,741 | B1 * | 12/2001 | Hunt | H05B 37/029 |
| | | | | 315/312 |
| 8,917,905 | B1 * | 12/2014 | Dill | A63J 1/02 |
| | | | | 382/103 |
| 2013/0193855 | A1 | 8/2013 | Bauer | |
| 2014/0343699 | A1 * | 11/2014 | Engelen | G06T 15/506 |
| | | | | 700/90 |
| 2018/0160507 | A1 * | 6/2018 | Feeney | H05B 37/029 |

FOREIGN PATENT DOCUMENTS

| | | |
|---|---|---|
| GB | 2336906 | 11/1999 |
| GB | 2499123 | 8/2013 |
| JP | 04-062703 | 2/1992 |
| WO | WO 2007/100258 | 9/2007 |
| WO | WO 2016/110627 | 7/2016 |
| WO | WO 2018/154108 | 8/2018 |

OTHER PUBLICATIONS

Internationaler Vorläufiger Bericht zur Patentierbarkeit [International Preliminary Report on Patentability] dated Jun. 3, 2019 From the International Preliminary Examining Authority Re. Application No. PCT/EP2018/054664. (7 Pages).

* cited by examiner

METHOD FOR CALIBRATING A ROTATABLE AND PIVOTABLE PIECE OF TECHNICAL STAGE EQUIPMENT

RELATED APPLICATIONS

This application is a National Phase of PCT Patent Application No. PCT/EP2018/054664 having International filing date of Feb. 26, 2018, which claims the benefit of priority of Austrian Patent Application No. A 50154/2017 filed on Feb. 27, 2017. The contents of the above applications are all incorporated by reference as if fully set forth herein in their entirety.

FIELD AND BACKGROUND OF THE INVENTION

The invention relates to a method for calibrating a rotatable and pivotable technical stage device.

EP 0 814 344 A2 describes a device and a method for a lighting equipment tracking a moving target. EP 1 385 335 A1 and WO 2007/100258 A1 describe methods relating to fixedly arranged projectors.

In particular for the lighting of stages in the field of theatre and event technology, but also for other uses, technical stage devices are known which are arranged rotatably and/or pivotably along two axes above a ground.

These devices may in particular be spotlights or cameras. Corresponding spotlights are for example known as moving heads or moving-head spotlights, while corresponding cameras are known as pan-tilt cameras or pan-tilt-zoom cameras.

The two axes are a pivot axis extending parallel to the ground (usually referred to as tilt axis) and a rotational axis extending normal to the ground (usually referred to as pan axis).

Such devices, in particular spotlights and cameras, are rotatable about the pan axis by usually 540°, i.e. one and a half turns, and pivotable about the tilt axis by usually 180° to 240°.

Thus, each point on the sphere sector covered can be reached in two ways: either with a certain pan value X and tilt value Y or with a pan value of X+180° rotated away and with the tilt value mirrored along the vertical axis (so-called tilt flip). If, for example, a corresponding spotlight projects a pattern, it would be visible on the stage normally in the first case and upside down in the second one.

With such a device that is fixedly or moveably mounted on the ceiling or a stage construction, e.g. a spotlight or camera, preferably each point on the stage may be reached by setting the pan and tilt values. A spotlight creates an illuminated, preferably elliptical, area on the ground by means of a directed cone of light. A camera captures a certain observation area of the stage.

In order to set up such moveable devices for the computer-aided and preferably automatic lighting or capturing of the performers on stage, the devices have to be calibrated with regard to their position and control values.

In particular, the position of the devices has to be known in absolute coordinates. In addition, it has to be known which control values of the protocol used lead to the desired rotation of the device, wherein the pan and tilt values of the device must be mapped to the most often used DMX protocol. In practice, however, several problems arise during calibration.

First, it has to be determined at which point in the three-dimensional space the device is located (x, y and z coordinates). This is usually done by measuring the stage space and the position of the technical stage devices, as well as by generating a three-dimensional model with the help of a computer.

This is cumbersome and prone to errors; in most cases, it is not possible to measure the exact position of the devices correctly. There is also a risk of an intentional or unintentional change of the position of the device between the time of the measurement and the time of the performance.

Furthermore, the relationship between the digital pan and tilt values used to control the device and the resulting changes in the absolute angular coordinates on the stage must be established. In other words, it has to be determined what pan and tilt values are required to achieve a certain angular change in the area on stage that is illuminated by the spotlight or observed by the camera.

This mapping assignment is also usually generated from the computer-generated 3D model; hence, the same inaccuracies may occur.

A reliable assignment of the computer-generated model to the real conditions in the stage space is not possible. Lastly, an unequivocal localisation of the technical stage devices also requires the determination of the rotation, i.e. the orientation of the technical stage device. Here, too, the problem arises that the computer-generated model generally does not correspond to the actual conditions.

SUMMARY OF THE INVENTION

According to the invention, these and other problems are solved by providing a method according to the characterising features of claim 1. The invention may in particular provide that an element is arranged on the ground adapted to interact with the technical stage device in a certain range of the pan and tilt values, that the technical stage device is rotated and pivoted by entering tilt and pan values until a pan and tilt value is reached at which the element interacts with the technical stage device, and that a mapping assignment of the pan values and/or tilt values to the angular coordinates of the technical stage device is determined by repeatedly rotating and/or pivoting the technical stage device and detecting the interaction of the technical stage device with the element.

According to the invention, the concept of interaction may comprise different physical interactions between the technical stage device arranged above the ground and the element arranged on the ground. In particular, an optical interaction may be provided. However, an interaction based on directed sound waves, e.g. ultrasonic pulses, or directed radio waves, e.g. radar, may also be provided. The type of interaction is not of fundamental importance for the implementation of the method according to the invention.

According to the invention, the technical stage device may in particular be a camera or a spotlight. The camera and the spotlight may be configured to emit and/or detect optical signals in any wave length range.

In the case of a spotlight, the invention may provide that the interacting element is configured as a light sensor which is configured to detect the illuminated area on the stage.

The spotlight may work in any wave length range, wherein the light sensor is configured to detect the signals sent by the spotlight. In particular, a wave length range of 380 nm to 780 nm (visible light) or higher (infrared) may be provided.

In the case of a camera, the invention may provide that the interacting element is configured as a light source or another optical marker. In this case, the camera is configured to detect when the light source or the optical marker is located in the observation area of the camera.

The invention may provide that the technical stage device is configured as a spotlight and creates an illuminated area on a ground, and that the element is configured as a light sensor, wherein the light sensor is arranged on the ground, wherein the illuminated area is moved across the ground by rotating and pivoting the spotlight, wherein the light sensor detects the edges of the illuminated area and wherein a mapping assignment of the pan values and/or tilt values of the spotlight to the angular coordinates of the spotlight is determined by rotating and/or pivoting the spotlight and by repeatedly detecting the illuminated area.

The light sensor may in particular be a smartphone, wherein the method according to the invention may preferably be executed or controlled by a smartphone app or a computer programme on a server.

The invention may in particular provide that a light sensor is first arranged on a ground. Then, the illuminated area is moved across the ground by moving the spotlight.

Subsequently, the light sensor detects the edges of the illuminated area. From the detected edges, a centre of the illuminated area is determined in the tilt and pan direction. Then, the spotlight is rotated further and the centre is determined anew. From the pan and/or tilt values used a mapping assignment is determined.

The invention may provide that the illuminated area is moved across the ground by rotating and pivoting the spotlight until the light sensor detects an edge of the illuminated area and that, subsequently, the dimensions as well as a centre of the illuminated area are determined by varying the pan value and/or the tilt value of the spotlight.

The invention may in particular provide that a complete rotation by 360° of the spotlight about the pan axis is performed for determining the mapping assignment after the detection of the illuminated area. The mapping assignment may be calculated from the used pan values at the first and second detection of the illuminated area.

However, in special situations the spotlight may not be able to perform a complete rotation by 360° after the detection of the illuminated area. Most moving-head spotlights allow a pan area of up to 540°. If a pan angle of under 180° is reached during the first detection of the illuminated area, a complete rotation by another 360° is possible so that the mapping assignment may be calculated from the two pan values. However, this is no longer possible if a pan angle of more than 180° is reached during the first detection of the illuminated area.

Hence, the invention may provide that for determining the mapping assignment after the detection of the illuminated area a rotation by 180° of the spotlight about the pan axis as well as a pivoting movement of the spotlight is performed in such a way that the tilt value of the spotlight is mirrored relatively to the pan axis (so-called tilt flip).

The advantage of this is that for a spotlight with a pan angular range of 0° to 540° (one and a half turns), each point on the stage can be reached by increasing the pan value by 180° and a following tilt flip: The first pan value is set in the range of up to 360°. Then, the pan value is increased by 180° and the tilt value is mirrored along the vertical axis of the spotlight, i.e. the pan axis, so that the spotlight pivots to the opposite side. The mapping assignment may in turn be calculated from the two pan values at the detection of the illuminated area.

The invention may provide that the dimensions of the illuminated area are detected and that the opening angle of the cone of light created by the spotlight is determined from the calculated mapping assignment. It may in particular be presupposed that the cone of light is symmetrical so that the opening angle is identical in the pan axis and the tilt axis.

The invention may provide that first, by measuring the illuminated area along the plane defined by the pan values, a mapping assignment of the pan values to absolute angle coordinates is determined as well as the opening angle of the cone of light along this plane and that, subsequently, a mapping assignment of the tilt values to absolute angle coordinates is determined by measuring the illuminated area along the plane defined by the tilt values.

The invention may provide that the technical stage device is configured as a camera which captures an observation area on a ground and that the interacting element is configured as a light source, optical marker or the like, wherein the element is arranged on the ground, wherein the observation area is moved across the ground by rotating and pivoting the camera, wherein the observation area or the edges of the observation area are detected by detecting the element and wherein a mapping assignment of the pan values and/or tilt values of the camera to the angular coordinates of the camera is determined by rotating and/or pivoting the camera and by repeatedly detecting the observation area.

In particular, the light source or the optical marker may be point shaped, for example in the form of a light-emitting diode.

The interacting element may be also be configured as optical marker on the ground, for example in the form of a crosshair. In this case, the camera is configured to detect when the crosshair is located in the observation area of the camera or in a certain area inside the observation area. Instead of a crosshair, multiple point markers may be arranged on the ground which can be detected by the camera.

For a reliable detection by the camera, it may in particular be provided that the marker is arranged in certain, particularly high-contrast colours on the ground, for example in white or yellow on a black ground or vice versa. Also in this case, it may be provided that the marker is implemented in a wave length range of 380 nm to 780 nm (visible light) or higher (infrared), as long as the camera is configured to detect markers of this wave length range.

The invention may provide that the observation area of the camera is moved across the ground by rotating and pivoting the camera until the interacting element is detected at the edge of or inside the observation area, and that, subsequently, the dimensions as well as a centre of the observation area are determined by varying the pan value and/or the tilt value of the camera.

The invention may provide that a complete rotation by 360° of the camera about the pan axis is performed for determining the mapping assignment after the detection of the observation area.

The invention may provide that for determining the mapping assignment after the detection of the observation area a rotation by 180° of the camera about the pan axis as well as a pivoting movement of the camera is performed in such a way that the tilt value of the camera is mirrored relatively to the pan axis.

The invention may provide that the dimensions of the observation area are detected and determined from the calculated mapping assignment of the opening angles of the area observed by the camera.

In case of a stage device with a non-symmetrical observation area, e. g. a HD camera with a rectangular observation area of 1920×1080 pixels, this may be taken into account when calculating the mapping assignment and the opening angle.

The invention may provide that first, by measuring the observation area along the plane defined by the pan values, a mapping assignment of the pan values to absolute angle coordinates is determined as well as the opening angle of the area observed by the camera along this plane and that, subsequently, a mapping assignment of the tilt values to absolute angle coordinates is determined by measuring the observation area along the plane defined by the tilt values.

The invention may provide that the method is performed for multiple, preferably three, known positions of the interacting element. To this end, the element may be consecutively arranged at three known positions on the ground and one method according to the invention, respectively, may be performed. Alternatively, of course, more elements may be arranged on the ground, which are reached consecutively.

The invention may provide that the absolute position and preferably also the orientation of the technical stage device in the three-dimensional space is determined from the detected pan and tilt values for preferably three known positions of the element.

Herein, the orientation of the technical stage device refers to the direction of the cone of light emitted by the spotlight and the observation area captured by the camera, respectively.

The invention also extends to a computer-readable storage medium, comprising a computer programme, e. g. a smartphone app or a programme on a server, which controls the course of the method according to the invention. The computer programme may in particular control the technical stage device with the necessary pan and tilt values, receive the measured values from the light sensor/the camera and calculate the target values of the method.

Further features according to the invention emerge from the patent claims, the description of the embodiments and the figures.

BRIEF DESCRIPTION OF THE SEVERAL VIEWS OF THE DRAWINGS

In the following, the invention is explained in more detail on the basis of a non-exclusive exemplary embodiment.

DESCRIPTION OF SPECIFIC EMBODIMENTS OF THE INVENTION

In an embodiment which is not shown, the method according to the invention is the same for a camera with a light source arranged on the ground, wherein the camera is configured to detect the light source.

Figure 1:
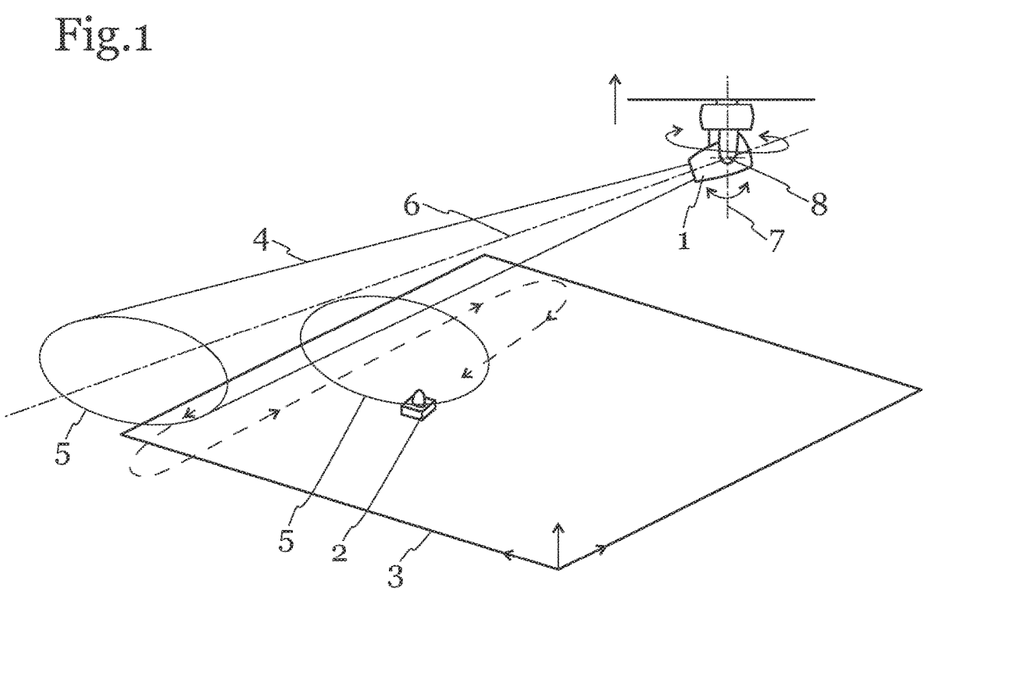
FIGS. 1, 2, 3, 4, 5, 6 and 7 show consecutive method steps of an embodiment of the method according to the invention on the basis of a spotlight and a light sensor which is arranged on the ground and detects the incident light.

FIG. 1 shows a ground 3, e. g. a theatre stage, and a spotlight 1 mounted above the ground. A light sensor 2 is arranged on the ground 3. In particular, the light sensor 2 is a wirelessly actuatable light sensor 2 in connection with an external computing unit. In particular, the light sensor is not fixedly connected to the ground 3, but placed removably on the ground. In an embodiment of the invention the light sensor 2 may be a smartphone which is wirelessly, e. g. via WIFI, connected to a server.

The method according to the invention is controlled via an app on the smartphone or via a computer programme on a server and the app or the computer programme on the server receives the measured values determined by the light sensor 2.

A threshold value for detecting incident light is pre-set on the light sensor 2 so that the light sensor 2 can detect if this threshold value is exceeded or not reached. A certain luminous intensity is not important for the detection. What is essential is not the height of the exceeded threshold value, but that the same light sensor 2 with an unchanged threshold value is used in the course of the entire method according to the invention.

The spotlight 1 is pivotable about to axes that are normal to each other. The spotlight is rotatable by about 540° along the schematically indicated pan axis 7. The spotlight is pivotable by 180° along the schematically indicated tilt axis 8. The spotlight 1 emits a cone of light 4 with a cone of light axis 6 creating an illuminated area 5 on the ground 3. The illuminated area 5 created on the ground 3 is usually elliptical.

By rotating about the pan and tilt axis, the spotlight 1 can illuminate every point on the ground 3. In the embodiment under consideration, the possible value range for the pan and tilt values is 0 to $2^{16}$=65536 ticks. Hence, from the pan value 0 to the pan value 65536, the spotlight rotates about the pan axis by about 540°. It can be assumed that the mapping of the pan values to the angular range is linear, but the exact mapping assignment of the pan values to the angular range covered is unknown. The same applies to the tilt values.

In an embodiment of the invention, first the light sensor 2 is placed on the ground 3 and then the cone of light 4 is systematically moved along a pre-defined curve across the ground 3 until the light sensor 2 detects the edge of the illuminated area 5. In FIG. 1, the curve along which the cone of light 4 is moved is schematically indicated as a dashed line.

As soon as the light sensor 2 detects an edge of the illuminated area 5, the movement of the spotlight 1 stops and the pan value p1 and the tilt value t1 of this position are saved.

Figure 2:
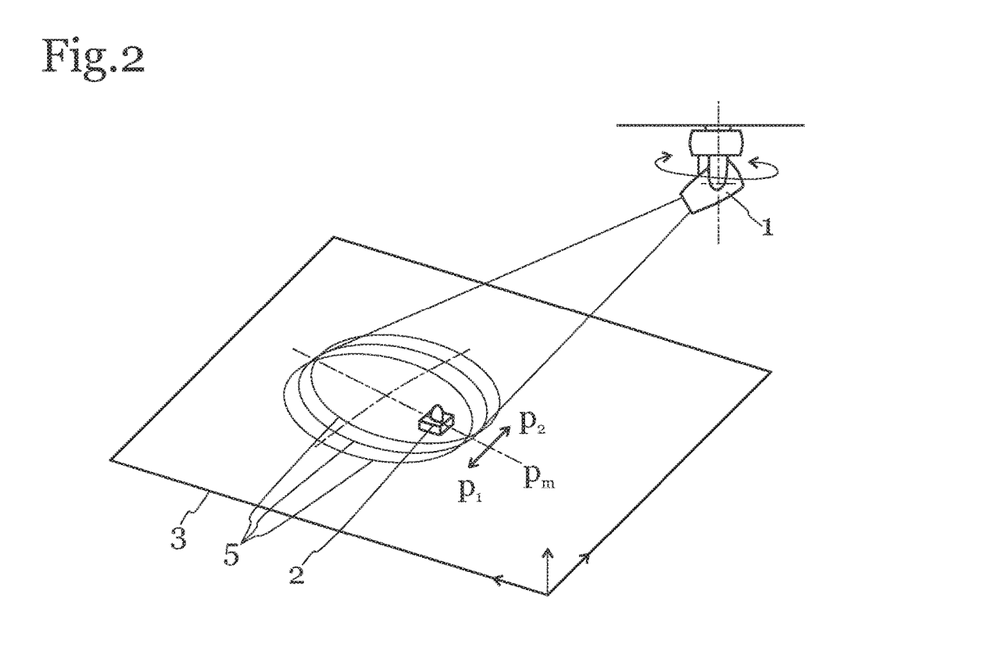

FIG. 2 shows the next step of an embodiment of the method according to the invention. In this step, starting from the edge of the illuminated area 5 which was detected first, the spotlight 1 is moved further, wherein the tilt value 7 in the pan axis remains the same, in order to detect the end of the illuminated area 5, i. e. a decrease of the luminous intensity sensed to below a threshold value. Once this is detected, the movement of the spotlight stops and the pan value p2 is saved. The centre in the direction of the pan axis pm is determined from pm=(p1+p2)/2 and the spotlight moved in this position.

In an exemplary embodiment of the method the pan values p1=30624 and p2=33184 are detected as edges of the illuminated area so that the centre in the direction of the pan axis pm is calculated as being 31904.

Figure 3:
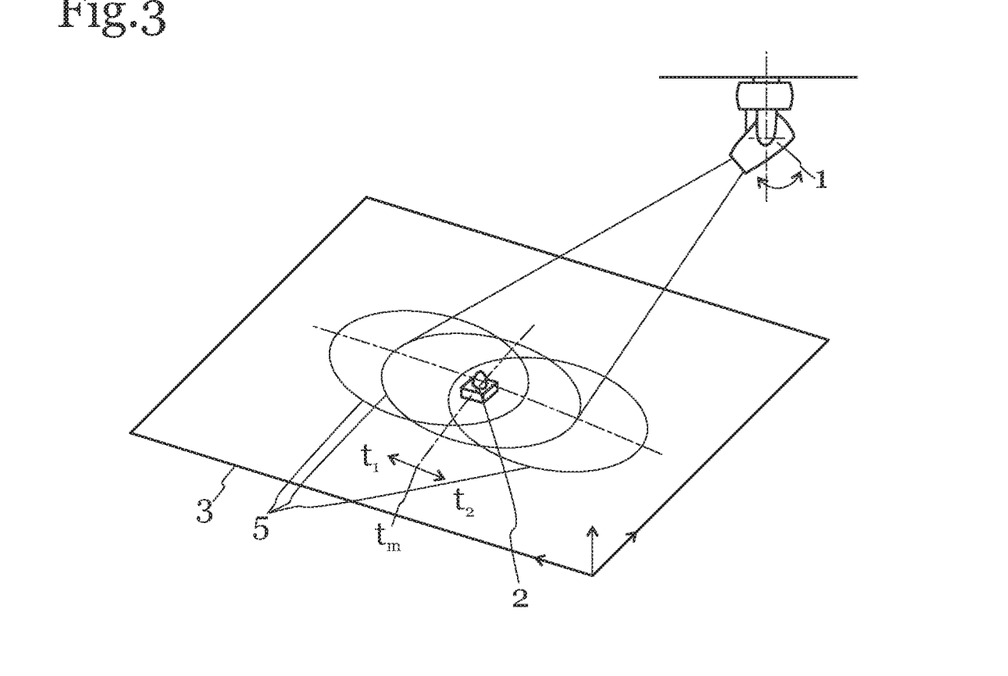

FIG. 3 shows the next step of this embodiment. In this step, the spotlight is moved back and forth along the tilt axis, wherein the pan value pm is fixed, until the two edges of the illuminated area are detected.

The respective tilt values along the pan value pm are saved as t1 and t2 and the average tm is calculated from tm=(t1+t2)/2. The centre of the illuminated area 5 is set in pan values and tilt values by the tupel of the two calculated averages pt1=(pm, tm).

Figure 4:
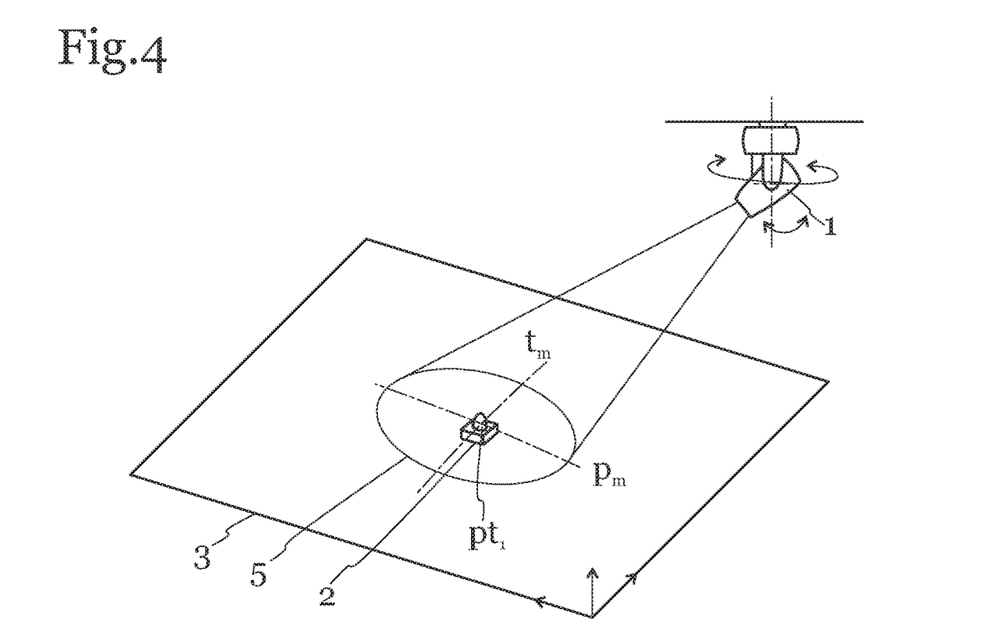

In FIG. 4 the spotlight 1 is controlled with the values of the tupel pt1 so that the centre of the illuminated area 5 moves to the exact position of the light sensor 2.

Figure 5:
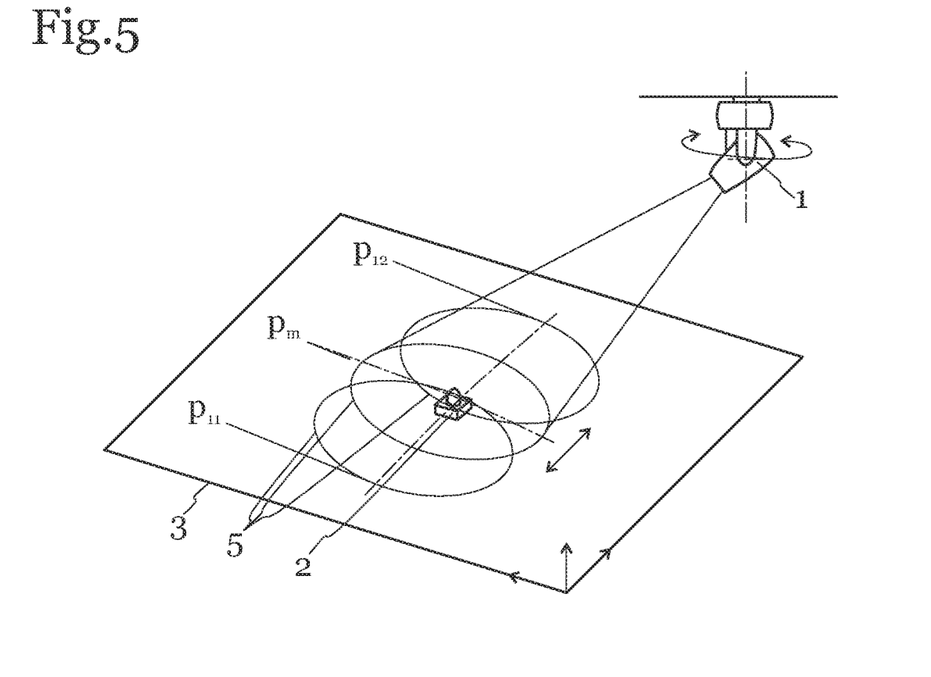

In FIG. 5, in a next step of the method, the pan expansion of the illuminated area 5 is determined in its centre. To this end, the spotlight 1 is moved back and forth along its pan axis, wherein the tilt value tm is fixed, and the edges of the illuminated area 5 are detected. This provides the outer delimiting pan values p11 and p12 of the illuminated area 5.

Figure 6:
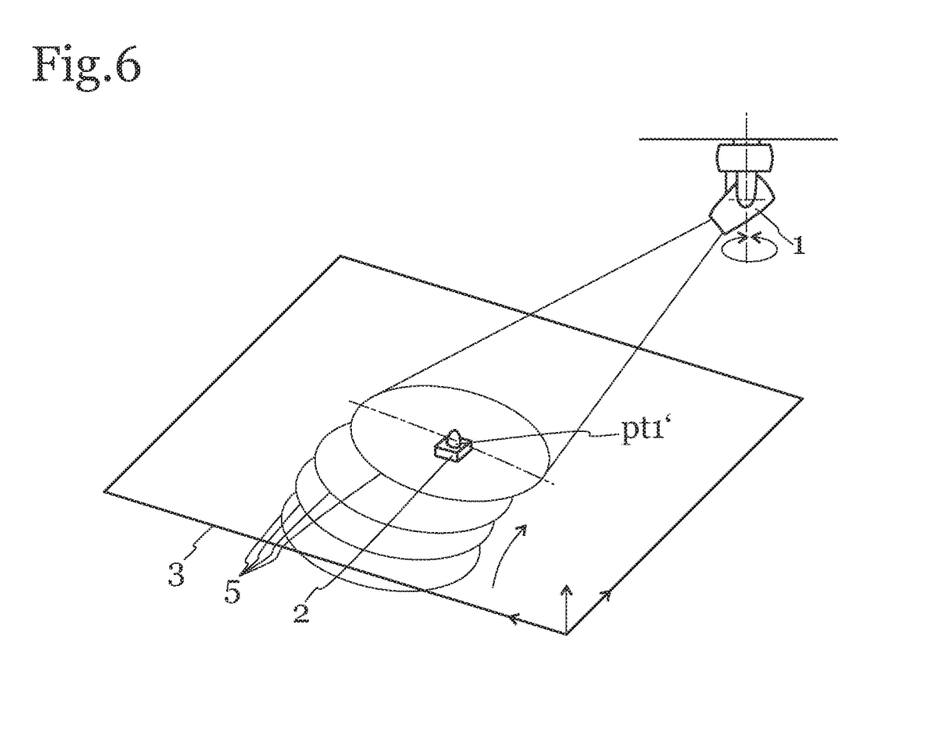

In FIG. 6, the spotlight performs a complete rotation by 360° about the pan axis until the illuminated area meets the light sensor 2 again.

In case the spotlight at point pt1 has been rotated about the pan axis so far that a further rotation by 360° about the pan axis is no longer possible, the spotlight may perform a rotation by 180° about the pan axis and a tilt flip, i. e. a mirroring of the tilt value about the vertical axis of the spotlight. This means that at a tilt value of t1=Y the new tilt value is set to 65536-Y.

However, the tilt value calculated in this manner is only correct if the tilt values are distributed symmetrically around the middle axis of the spotlight. If this is not the case, the tilt flip may lead to an incorrect tilt value. Thus, an embodiment of the invention provides that the new tilt value after the tilt flip is not set to 65536-Y, but that the limits of the illuminated area are determined anew by pivoting the spotlight back and forth along the tilt axis, wherein the pan value is fixed, and that the new tilt value tm' is calculated from them.

Then, by increasing the pan value the outer delimiting pan values p21 and p22 are measured anew and the average pm is calculated from pm'=(p21+p22)/2. The centre of the illuminated area 5 is set in pan values and tilt values by the tupel pt1'=(pm', tm').

When detecting the illuminated area anew, the values p21=52504 and p22=55064 are, for example, determined so that the point pm' takes on the value 53784.

Hence, it is known that the spotlight has performed a rotation by a certain angle between the first detected pan value 33184 and the second detected pan value 55064, namely either 360° without tilt flip or 180° if a tilt flip was necessary.

Now, from the difference of the points pt1 and pt1' a mapping assignment of the pan values to the absolute angle coordinates can be determined. In case the spotlight only performed a rotation by 180° and a tilt flip, the difference of the pan values has to be mapped to a rotation by 180°.

From the two limits of the illuminated area 5 and the mapping assignment between the pan values and the absolute angle coordinates, which is now known, the next step may be to determine the opening angle γ of the cone of light 4 in the pan plane. The opening angle γ corresponds to the difference of the absolute angle coordinates corresponding to the pan values p21 and p22.

Figure 7:
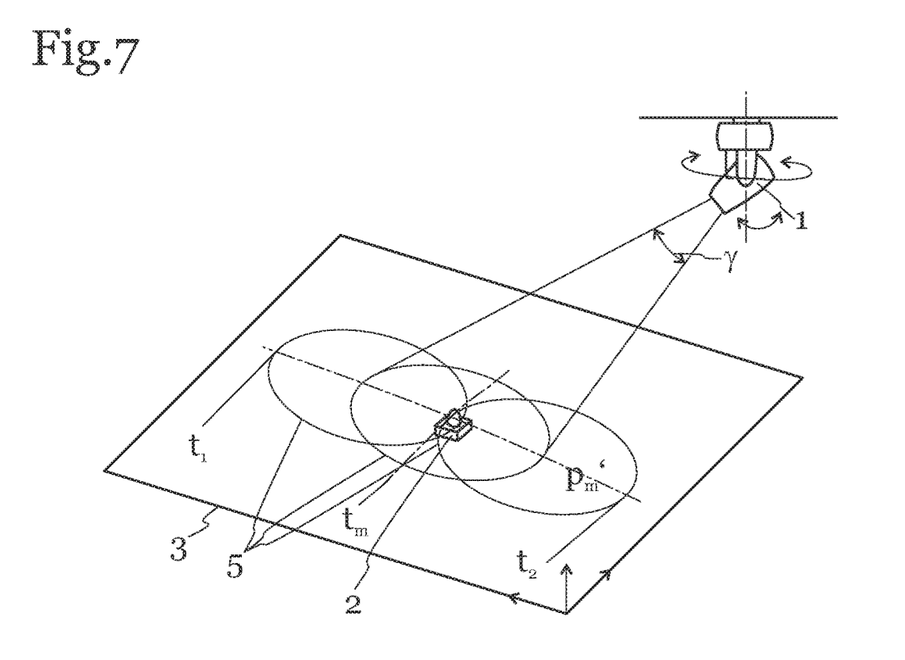

In the optional step according to FIG. 7, the spotlight is first centred on the centre pm' in the pan axis. Then, the limits of the illuminated area t1 and t2 are determined anew by pivoting the spotlight back and forth along the tilt axis, wherein the pan value is fixed. From the difference of t1 and t2 the mapping assignment of the tilt values to the absolute angle coordinates in the tilt plane can be calculated by comparison with the known opening angle γ of the cone of light 4.

It is presupposed that the opening angle γ of the cone of light 4 is identical in the pan plane and the tilt plane. In case of a non-symmetrical cone of light this may be taken into account in the calculation.

According to another embodiment of the invention, the illuminated area 5 is measured and the centre pm is determined for multiple, preferable three different, but known positions in absolute coordinates x, y, z of the light sensor 2. Preferably, this results in three tupels pt1, pt2 and pt3 of pan/tilt values.

From the tilt values and the pan values of the three light sensors together with the known respective positions x, y, z of the light sensors the position of the spotlight 1 can be determined in the absolute space by means of known methods.

Furthermore, the orientation of the spotlight 1, i. e. the direction of the cone of light emitted by the spotlight, can be determined from these values. To this end, a multi-dimensional linear equation system may be established which can be solved by a mathematical algorithm, e. g. a 3D solver, which is per se known.

What is claimed is:

1. A method for calibrating a technical stage device which is rotatable about a pan axis (7) by entering pan values and pivotable about a tilt axis (8) by entering tilt values and which is arranged above a ground (3), wherein
   a. an element is arranged on the ground (3) adapted to interact with the technical stage device in a certain range of the pan and tilt values,
   b. the technical stage device is rotated and pivoted by entering tilt and pan values until a pan and tilt value is reached at which the element interacts with the technical stage device,
   c. wherein
      i. the technical stage device is either configured as a spotlight (1) and creates an illuminated area (5) on a ground (3), and the interacting element is configured as a light sensor (2) which detects the edges of the illuminated area (5), or
      ii. the technical stage device is configured as a camera which captures an observation area on a ground (3) and the interacting element is configured as a light source, optical marker or the like so that the observation area is detected by detecting the element,
   characterized in that
   d. a mapping assignment of the pan values and/or tilt values to the angular coordinates of the technical stage device is determined by repeatedly rotating and/or pivoting the technical stage device and detecting the interaction of the technical stage device with the element.

2. The method according to claim 1, characterized in that the technical stage device is configured as a spotlight (1) and creates an illuminated area (5) on a ground (3), and in that the interacting element is configured as a light sensor (2), wherein
   a. the light sensor (2) is arranged on the ground (3),
   b. the illuminated area (5) is moved across the ground (3) by rotating and pivoting the spotlight (1),
   c. the light sensor (2) detects the edges of the illuminated area (5),
   d. a mapping assignment of the pan values and/or tilt values of the spotlight (1) to the angular coordinates of the spotlight (1) is determined by rotating and/or pivoting the spotlight (1) and by repeatedly detecting the illuminated area (5).

3. The method according to claim 2, characterized in that the illuminated area (5) is moved across the ground (3) by rotating and pivoting the spotlight (1) until the light sensor (2) detects an edge of the illuminated area (5) and in that, subsequently, the dimensions as well as a centre of the illuminated area (5) are determined by varying the pan value and/or the tilt value of the spotlight (1).

4. The method according to claim 2 or 3, characterized in that a complete rotation by 360° of the spotlight (1) about the pan axis (7) is performed for determining the mapping assignment after the detection of the illuminated area (5).

5. The method according to claim 2 or 3, characterized in that for determining the mapping assignment after the detection of the illuminated area (5) a rotation by 180° of the spotlight (1) about the pan axis (7) as well as a pivoting movement of the spotlight (1) are performed in such a way that the tilt value of the spotlight (1) is mirrored relatively to the pan axis (7).

6. The method according to claim 2, characterized in that the dimensions of the illuminated area (5) are detected and that the opening angle of the cone of light (4) is determined from the calculated mapping assignment.

7. The method according to claim 6, characterized in that the observation area is moved across the ground (3) by rotating and pivoting the camera until the observation area is detected by detecting the element, and in that, subsequently, the dimensions as well as a centre of the observation area are determined by varying the pan value and/or the tilt value of the camera.

8. The method according to claim 2, characterized in that first, by measuring the illuminated area (5) along the plane defined by the pan values, a mapping assignment of the pan values to absolute angle coordinates is determined as well as the opening angle of the cone of light (4) along this plane and that, subsequently, a mapping assignment of the tilt values to absolute angle coordinates is determined by measuring the illuminated area (5) along the plane defined by the tilt values.

9. The method according to claim 1, characterized in that the technical stage device is configured as a camera which captures an observation area on a ground (3) and in that the interacting element is configured as a light source, optical marker or the like, wherein
  a. the element is placed on the ground (3),
  b. the observation area is moved across the ground (3) by rotating and pivoting the camera,
  c. the observation area is detected by detecting the element,
  d. a mapping assignment of the pan values and/or tilt values of the camera to the angular coordinates of the camera is determined by rotating and/or pivoting the camera and by repeatedly detecting the observation area.

10. The method according to claim 9, characterized in that a complete rotation by 360° of the camera about the pan axis (7) is performed for determining the mapping assignment after the detection of the observation area.

11. The method according to claim 9, characterized in that for determining the mapping assignment after the detection of the observation area a rotation by 180° of the camera about the pan axis (7) as well as a pivoting movement of the camera is performed in such a way that the tilt value of the camera is mirrored relatively to the pan axis (7).

12. The method according to claim 9, characterized in that the dimensions of the observation area are detected and in that the opening angle of the area observed by the camera is determined from the calculated mapping assignment.

13. The method according to claim 9, characterized in that first, by measuring the observation area along the plane defined by the pan values, a mapping assignment of the pan values to absolute angle coordinates is determined as well as the opening angle of the area observed by the camera along this plane and that, subsequently, a mapping assignment of the tilt values to absolute angle coordinates is determined by measuring the observation area along the plane defined by the tilt values.

14. The method according to claim 1, characterized in that the method is performed for multiple, preferably three, known positions of the element.

15. The method according to claim 14, characterized in that the absolute position of the technical stage device in the three-dimensional space is determined from the detected pan and tilt values for preferably three known positions of the element.

16. The method according to claim 14 or 15, characterized in that the orientation of the technical stage device is determined from the detected pan and tilt values for preferably three known positions of the element.

17. A computer-readable storage medium, comprising a computer programme for controlling the course of a method according to claim 1.

* * * * *